US006549878B1

(12) United States Patent
Lowry et al.

(10) Patent No.: US 6,549,878 B1
(45) Date of Patent: Apr. 15, 2003

(54) SYSTEM AND METHOD FOR EDITING A SPREADSHEET VIA AN IMPROVED EDITING AND CELL SELECTION MODEL

(75) Inventors: Kent R. Lowry, Seattle, WA (US); Mark S. Igra, Seattle, WA (US); Brian Frank, Austin, TX (US); Jeanell D. Sullivan, Carnation, WA (US); Justin M. Maguire, III, Seattle, WA (US); Matthew J. Androski, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/223,864

(22) Filed: Dec. 31, 1998

(51) Int. Cl.[7] .............................................. G06F 17/21
(52) U.S. Cl. ...................................... 702/503; 707/504
(58) Field of Search .............................. 707/503, 504, 707/539, 540; 345/780, 823

(56) References Cited

U.S. PATENT DOCUMENTS

| | | | | |
|---|---|---|---|---|
| 4,723,211 A | * | 2/1988 | Barker et al. ................. | 707/514 |
| 5,021,973 A | * | 6/1991 | Hernandez et al. .......... | 707/504 |
| 5,253,362 A | * | 10/1993 | Nolan et al. ................. | 707/512 |
| 5,450,539 A | * | 9/1995 | Ruben .......................... | 707/901 |
| 5,550,563 A | * | 8/1996 | Matheny et al. .............. | 345/856 |
| 5,581,686 A | * | 12/1996 | Koppolu et al. .............. | 707/516 |
| 5,590,259 A | * | 12/1996 | Anderson et al. ............ | 707/503 |
| 5,598,519 A | * | 1/1997 | Narayanan .................... | 707/504 |
| 5,603,021 A | * | 2/1997 | Spencer et al. ................ | 707/4 |
| 5,604,854 A | * | 2/1997 | Glassey ......................... | 707/504 |
| 5,623,282 A | * | 4/1997 | Graham et al. ............... | 707/530 |
| 5,717,877 A | * | 2/1998 | Orton et al. .................. | 345/835 |
| 5,721,847 A | * | 2/1998 | Johnson ........................ | 707/503 |
| 5,848,187 A | * | 12/1998 | Bricklin et al. .............. | 382/187 |
| 6,112,214 A | * | 8/2000 | Graham et al. ............... | 707/531 |
| 6,157,934 A | * | 12/2000 | Khan et al. ................... | 707/504 |
| 6,259,446 B1 | * | 7/2001 | Matheny et al. .............. | 345/764 |
| 6,301,586 B1 | * | 10/2001 | Yang et al. ................... | 707/104.1 |

OTHER PUBLICATIONS

Borland, R. "Microsoft Windows 98: Official Preview Kit"(Redmond: Microsoft Press), pp. 46–49, Oct. 1997.*
Underdahl, B. "Using Quattro Pro 6 for Windows, special edition", (Indianapolis: Que Corporation), pp. 132–133, Dec. 1994.*
McNierney, E. "The user at the controls. (the Presentation Manager simplifies the developer's job with OS–2." PC Tech Journal vol. 6, No. 3, pp. 64(12)(reprinted), Mar. 1988.*

* cited by examiner

*Primary Examiner*—Stephen S. Hong
(74) *Attorney, Agent, or Firm*—Merchant & Gould P.C.

(57) ABSTRACT

Editing cells within a spreadsheet to change the contents of a spreadsheet. To enter edit mode and alter the contents of a cell, the user first selects a cell by single clicking a mouse button while the mouse indicator is positioned above the cell. The user then initiates another single click when the mouse indicator is positioned above the selected cell. Once edit mode is active, the user may change the contents of the cell from within the web browser window as desired. Edit mode can be exited through one of three methods: an "exit and save" signal, an "exit and discard" signal, or a click and drag maneuver. The exit and save signal prompts the invention to save all changes to the cell that the user has made. The exit and discard signal prompts the invention to discard any changes made to the cell by the user, revert to the pre-edit mode contents of the edit cell, and exit edit mode. Finally, a click and drag maneuver not only exits edit mode, but selects a range of cells. The click and drag is performed by depressing a mouse button while the mouse indicator is positioned over the edit cell, moving the mouse while holding the mouse button depressed, and releasing the mouse button when the end of the desired range of cells is reached. The range of cells selected will then start with the edit cell and continue to the cell over which the mouse indicator was positioned when the mouse button was released.

17 Claims, 8 Drawing Sheets

SYSTEM AND METHOD FOR EDITING A SPREADSHEET VIA AN IMPROVED EDITING AND CELL SELECTION MODEL

TECHNICAL FIELD

The present invention relates to editing a spreadsheet, and is more particularly directed to editing a spreadsheet through the use of improved editing and cell selection models.

BACKGROUND OF THE INVENTION

Spreadsheet programs are a useful tool in performing computational tasks such as keeping household budgets, work schedules, tracking bank accounts, maintaining inventories, and so on. As the use of personal computers within the home and business environments becomes more common, so too does the use of the spreadsheet program. The versatility of spreadsheet applications and the ease with which they are adapted to various tasks has resulted in their widespread use. With ongoing advances in the speed and capabilities of personal computers, enhanced features have been developed for spreadsheet programs.

In a typical spreadsheet program, the spreadsheet comprises multiple cells containing numbers, text, or formulae. Users require the capability to edit the data in the various cells of the spreadsheet in order to update the spreadsheet as necessary. Further, the editing model must be kept separate from the model used to select cells for formatting, copying, or movement purposes, so as to minimize errors and unwanted results stemming from an overlap between the two models of cell operation.

Editing the contents of a cell has traditionally been performed by selecting a specific cell, then entering an edit mode through one of various provided means. In general, a user enters edit mode through the use of a formula bar, keys on a keyboard, or a double-click from a mouse. Double-clicking a cell in order to edit the cell's contents is rarely discovered by novice users. Indeed, even many seasoned spreadsheet users are unaware that a double-click will allow the editing of a cell's contents, and instead rely solely of the use of the formula bar. Unfortunately, the implementation of a formula bar in a spreadsheet program is not always efficient or possible. Further, many novice users are unaware that the contents of a cell may be edited selectively, rather than being completely replaced, because the previous methods are unintuitive for the first-time user. Because novice users are often unaware of any way to edit the contents of a cell, they often end up retyping everything in order to change a single letter. Therefore, it is desirable to provide a method to edit the contents of a cell that is both intuitive and simple to use, and is obvious to a novice user.

The increased speed and capability of computers has led to an increased reliance on them in a business setting. Information that was once routinely transmitted by courier, mail, or telephone now is quickly accessed through the use of the personal computer, minimizing delivery times and costs. Traditionally, remotely accessed spreadsheets were emailed from one user to another, transferred on disk, copied via file transfer protocol (FTP), or even viewed across the World Wide Web by means of a Web browser. However, each of these options has inherent drawbacks. Email or FTP only gives the user a copy of the document, then forcing him to launch a spreadsheet-editing program. Further, many users lack any type of FTP program or knowledge about how to employ one. Web browsing typically does not allow a user to alter a spreadsheet, only to view its contents. Thus, there is a need to provide a method to access and edit a spreadsheet remotely located from a user that is simple and intuitive, and does not require launching multiple programs.

SUMMARY OF THE INVENTION

The invention is a system and a method for editing a spreadsheet without interfering with the spreadsheet's cell selection model. During use of a spreadsheet, a user needs to have a simple and effective method for editing the contents of a given cell. Editing may be defined as providing the ability to change all or just a portion of the contents of a cell. For example, a cell may contain a long string of characters and the user needs to change just a single letter. While it is possible to retype the entire contents, a more efficient method of editing this cell to change just the single letter is made more accessible by this invention. This method, however, must not conflict with a user's ability to select multiple cells for formatting, copying, moving, or other group editing functions. Further, such selection must be intuitive to avoid erasing a cell's contents and retyping them.

A standard model for selecting a cell to edit is the use of a mouse double-click, while the cursor is positioned above the desired cell. A "double-click" is defined a depression and release of a mouse button, quickly followed by another. This generates two separate button data indications. By contrast, one button data indication comprises a "single-click." The time interval within which both button data indications must occur in order to register as a double-click (rather than two separate clicks) is variable, and can typically be set by a user. For example, Microsoft's "EXCEL" electronic spreadsheet program uses this model. However, inexperienced users may not be aware of this selection method. Even experienced users tend to rely on the formula bar when editing data. Because implementing a formula bar in a web-based spreadsheet application is unduly complex, this leaves both first-time and seasoned spreadsheet users without an opportunity to use the most direct method for editing a cell's contents.

The invention provides a simple, intuitive alternative to editing the contents of a spreadsheet cell with the formula bar. It allows a user to select a cell, then single-click to enter edit mode. This is euphemistically referred to as an "infinite double-click." The cell is initially activated by means of a first click. Whenever the cursor is placed above the active cell, the cursor changes appearance, typically by changing from the standard "plus" symbol to an I-bar, to signify that the user may enter edit mode with a single click. This allows a user to instantly recognize that edit mode is available in connection with the seleceted cell. Clicking on the active cell then enters edit mode at the place in the selected cell above which the cursor was located, allowing the user to edit the contents of the cell. That is, any changes the user makes in edit mode will initially appear at the point in the cell corresponding to the position of the tip of the cursor at the time edit mode was activated. This additionally allows a user to edit the selected cell without retyping its entire contents. It is an additional advantage of the invention that the click to enter edit mode may come at any time after the cell is initially selected by a single click, rather than forcing both clicks to occur within a set timeframe.

If a cell is placed in edit mode, an explicit action to exit edit mode may be performed by the user. Exiting edit mode may be accomplished in multiple ways. For example, a user may hit the "Escape" key in order to exit edit mode and discard any changes. Alternately, a user may hit a keyboard key, typically the "Enter" key, to apply any changes are return to selection mode. Both of these methods are standard practice with spreadsheet programs. As an important enhancement provided as part of this invention for exiting edit mode, a user may depress a mouse button, and while the button is held down, may drag the cursor beyond the cell boundary in order to leave edit mode and return to select mode. This option is provided in order to ensure that a user selecting a group of cells with a "click and drag" motion does not have to abort the motion in order to exit edit mode, since an initial click on an active cell would put the user into edit mode.

Generally described, the present invention allows a user to edit a spreadsheet comprising a grid of cells. Upon displaying a spreadsheet, a monitoring operation is conducted to detect an input signal, typically consisting of an alphanumeric character or button data, generated by an input device. Once the input signal is received, a cell of the spreadsheet is selected if an input device indicator was positioned over the cell when the signal was generated. Once a second input signal is detected, an edit mode is entered, thereby allowing a user to edit the contents of the selected cell.

More specifically described, the present invention is a computer-readable medium on which is stored a spreadsheet editing program. A computer is first operative to display a spreadsheet comprising multiple cells. An indication that a cell has been selected is then generated. In response to an indication that the cell has been selected, a visual indication is placed around the selected cell. This visual indication takes the place of a dark cell border in order to provide visual feedback indicating the position of the selected cell. Next, an indication that the selected cell has been selected may be generated. In response to the indication that the selected cell has been selected, an edit mode is entered for the edit cell (formerly the selected cell.) The edit mode allows for editing the contents of the edit cell in accordance with the wishes of the user. An edit cell in edit mode is indicated by displaying a second visual indication around the edit cell. This second visual indication takes the place of a lighter cell border than the selected cell border, yet still darker than the normal cell border.

Position data from an input device, where the position data is indicative of the position of the input device indicator, is also received. Coupled with this is an indication from the input device that the edit cell has been selected, typically in the form of a mouse button depressed signal while the input device indicator is positioned over the edit cell. In response to the indication that the edit cell has been selected a first position indication corresponding to the position of the input device indicator when the third input signal was initiated is provided. As the input device is moved while the indication that the edit cell has been selected is maintained, visual feedback corresponding to a selection region is provided. The selection region includes a rectangular area extending from the first position indication through the current position data. When the input signal is terminated, a range of cells that are included in the selection region is selected, and edit mode is exited.

DETAILED DESCRIPTION

The present invention is directed to a system and method for editing the contents of a spreadsheet. In an exemplary embodiment, the invention is incorporated into the "Microsoft Office Spreadsheet Component", which is one of the "Microsoft Office Web Components" typically used within the "INTERNET EXPLORER" web browser program. The Web Components and "INTERNET EXPLORER" are produced and distributed by Microsoft Corporation of Redmond, Washington. Briefly described, the "Spreadsheet Component" is an ActiveX control, and the "INTERNET EXPLORER" web browser program allows the user to access information available on the World Wide Web. Oftentimes, this information may take the form of a spreadsheet that one user wishes to share with another. The spreadsheet includes a plurality of cells, each containing its own data. The capabilities of the present invention, specifically the editing capabilities, will be described in greater detail herein below with respect to FIGS. 1–8, wherein like elements are represented by like numerals throughout the several figures.

Figure 1:
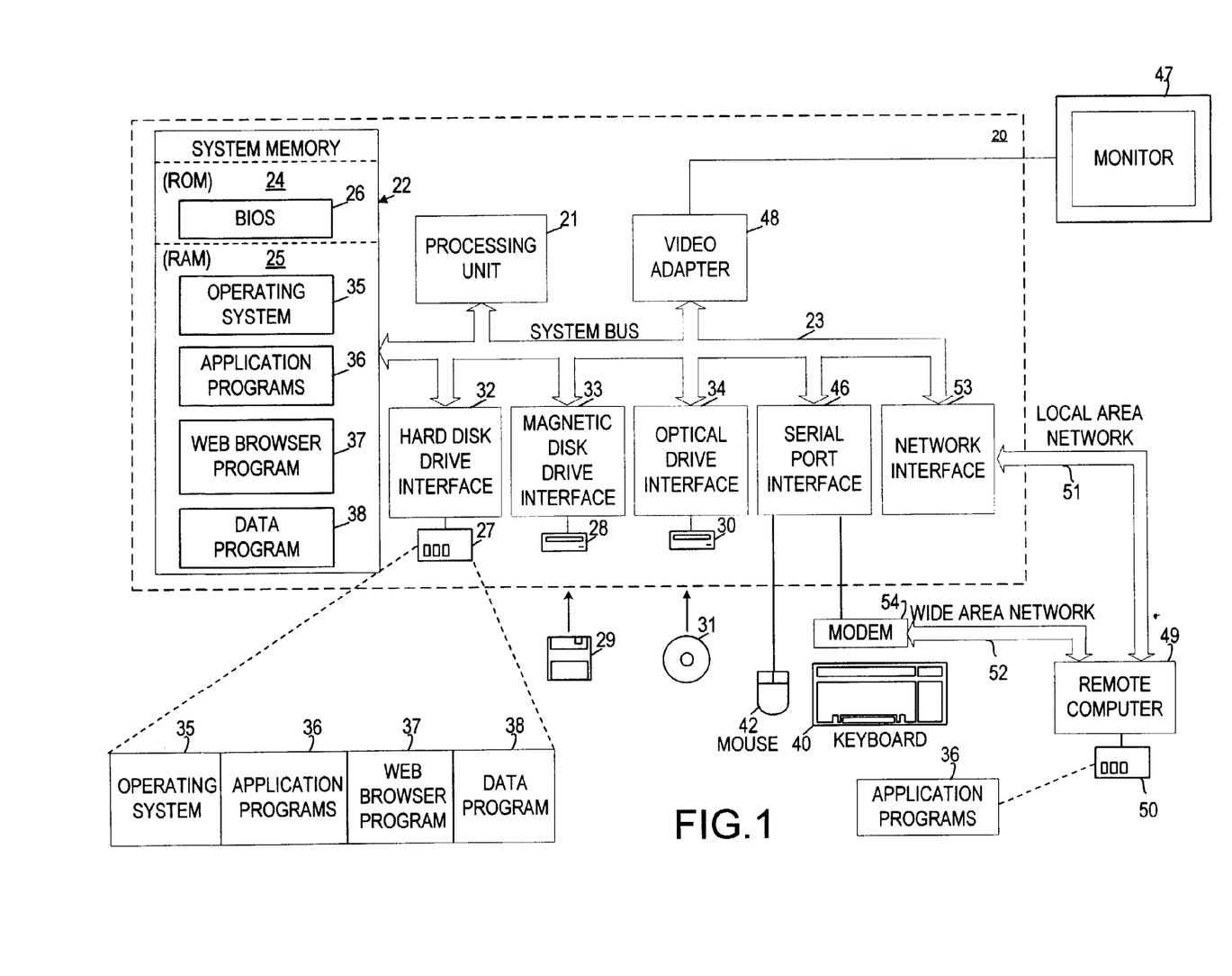
FIG. 1 is a block diagram of a personal computer that provides an exemplary operating environment for an exemplary embodiment of the present invention.

Now turning to FIG. 1, an exemplary operating environment in accordance with the exemplary embodiment of the present invention is now described.

Exemplary Operating Environment

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a web browser program 37, and program data 38. A user may enter commands and information into the personal computer 20 through conventional input devices, including a keyboard 40 and pointing device, such as a mouse 42. Other input devices (not shown) may include a pen, touch-operated device, microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A display screen 47 or other type of display device is also connected to the system bus 23 via an interface, such as a video adapter 48. In addition to the display screen 47, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, application programs depicted relative to the personal computer 20, or portions thereof, may be stored in the remote memory storage device. It will be appreciated that the network connections shown are exemplary and other means of establishing a communications link between the computers may be used.

Exemplary Method for Editing a Spreadsheet

FIGS. 2–6 illustrate screen displays that depict a process by which a user can edit a spreadsheet within a web browser. The spreadsheet contains a grid of cells, which may be edited by entering an edit mode, accessible using a single indication from an input device such as the mouse 42, having one or more buttons.

Figure 2:
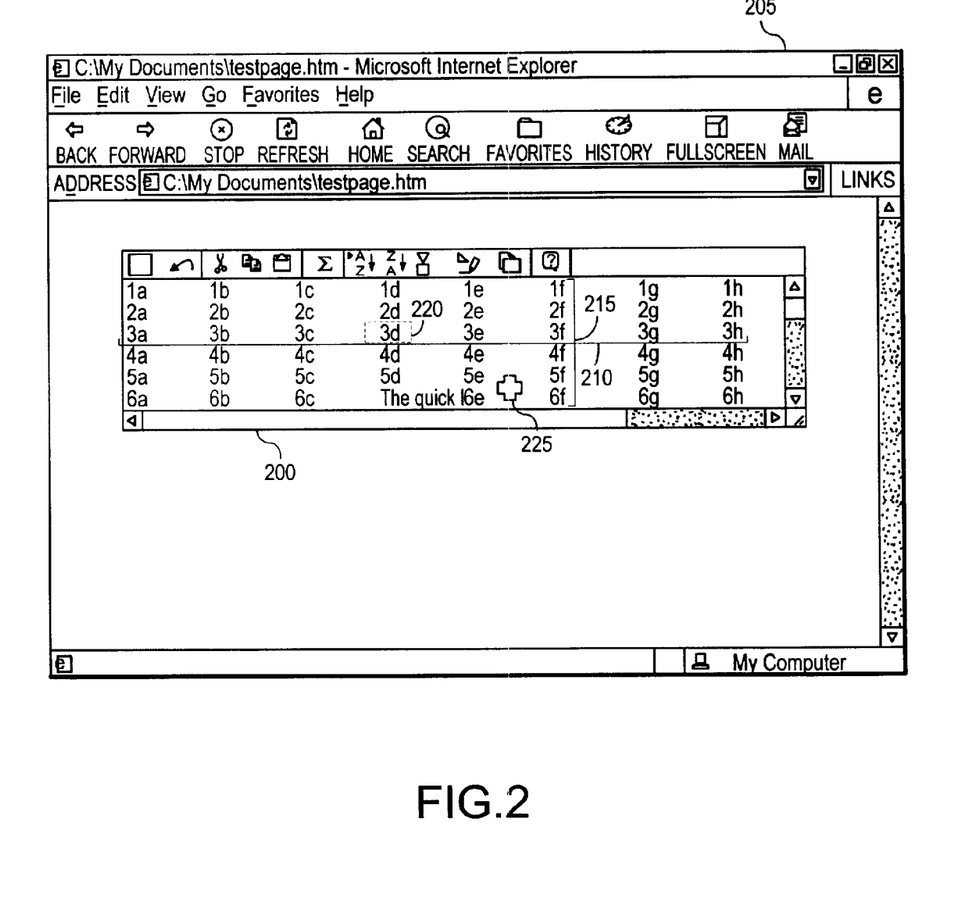
FIG. 2 is a screen display illustrating an initial application window in accordance with an exemplary embodiment of the present invention.

FIG. 2 depicts a spreadsheet 200 that is displayed within a web browser window 205. The web browser window can be displayed on the display screen 47 when the exemplary program 37 is run on the computer 20. The spreadsheet 200 is retrieved as an HTML document in order to be displayed within the web browser window. The spreadsheet may be retrieved from storage on a local disk 20, a CD-ROM, from a remote computer 49 logically connected a WAN 52 or LAN 51, from system memory 22, or other possibilities that will occur to those skilled in the art. The spreadsheet 200 consists of a grid of cells 220, organized by rows and columns. A cell 220 is located in an XY plane of the spreadsheet 200, wherein adjacent cells along the horizontal axis define a row 210 and adjacent cells along the vertical axis define a column 215. Rows are typically referenced with numbers, while columns are typically referenced with letters. Thus, a cell 220 may be referenced in terms of the row 210 ("3") and column 215 ("D") of which it is a part. For example, the cell 220 is part of the third row and fourth column, and is so referred to as "cell D3."

Cells contain various forms of data: data may be numbers, letters, formulae, or any combination thereof. For example, presume a spreadsheet consists of four cells: cell A, cell B, cell C, and cell D. Cells A and B may contain numerical data, such as the numbers fourteen and twenty-two. Cell C may contain a word, such as "house." Cell D may contain a summing formula, adding together the contents of cells A and B and displaying the result. In this example, cell D would display the numerical value thirty-six to a user, rather than the summing formula itself. The formula would be visible only when a user selects cell D and enters edit mode, as described in conjunction with FIGS. 4 through 6. A user may manipulate an input device to move the input device indicator 225 on the display screen 47 in order to select a cell or range of cells, or perform other operations upon the spreadsheet 200. In an exemplary embodiment, the input device indicator 225 takes the shape of a plus symbol. Other embodiments may vary the appearance of the input device indicator.

An exemplary embodiment operates in two different modes: select mode and edit mode. Select mode allows a user to select, manipulate, move, or copy a cell, in addition to other actions. Essentially, any action that is not taken while in edit mode is part of select mode. Select mode is discussed in particular detail with respect to FIG. 3. Edit mode allows a user to manipulate or change the contents of the cell 220, rather than the cell itself. Edit mode is discussed in particular detail with respect to FIGS. 4 through 6.

Figure 3:
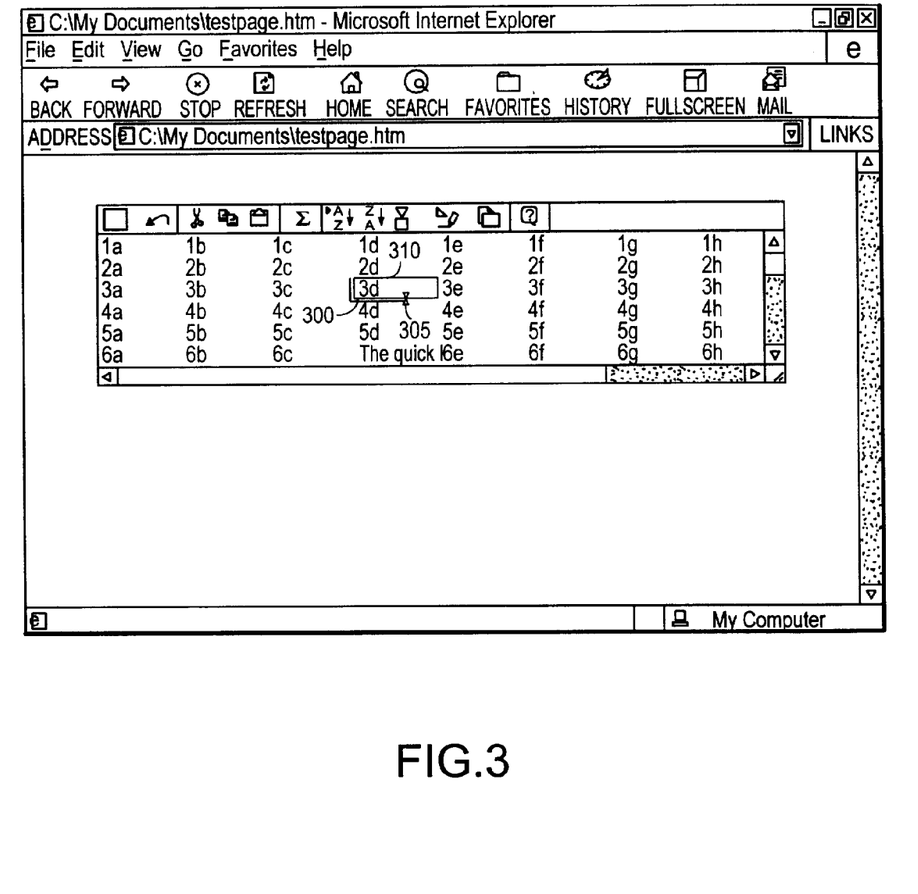
FIG. 3 is a screen display illustrating a selected cell and edit mode available cursor in accordance with an exemplary embodiment of the present invention.

If a user wishes to manipulate or edit a cell, that cell must first be selected. FIG. 3 displays a selected cell 300 within the spreadsheet 200, presented by the web browser window 205. One method of selecting a cell is through the use of an input device such as a mouse. In order to select a cell through the use of an input device, a user moves the input device so that the input device indicator 225 is positioned over the cell 220. The user then initiates an input signal using the input device. The method used to select a cell in the exemplary program is offered by way of example and not as a limitation. In this exemplary embodiment, cell selection is completed by moving a mouse 42 until a cursor is positioned over a cell, then clicking the mouse button once. Alternately, a user can select a cell by pressing a keyboard key, such as the Return key or directional arrow keys on a keyboard 40. In either case, the input signal comprises a single indication, such as a single keystroke or single mouse click. By contrast, a mouse double-click would involve initiating two input signals in rapid succession. Other possible embodiments can include the use of a keyboard 40, a light pen, a trackball, a touchpad, and other input devices that will be apparent to those skilled in the art upon reading this description, for generation of an input signal.

Once the user has selected a cell, the exemplary embodiment updates the border of the cell to indicate that it is now a selected cell 300. The selected cell border 310 comprises a thick black line, as shown in FIG. 3. This display differentiates the selected cell from those around it, providing visual feedback to the user to indicate which cell he has selected.

Further, if the input device indicator is placed over the selected cell, the input device indicator 225 now changes to a second predetermined configuration when it is positioned over the selected cell 300. By way of example and not limitation, in the exemplary program, the input device indicator changes from its previously mentioned plus shape, as shown by input device indicator 225 in FIG. 2, to that of an I-bar, as illustrated by the input device indicator 305 in FIG. 3. The I-bar cursor traditionally indicates that the user is currently in edit mode in several different types of applications, including spreadsheets, word processors, and graphics programs. That is, previous spreadsheet programs only displayed the I-bar cursor when the user was actively engaged in editing the contents of a cell. Here, however, it indicates not that the user is currently in edit mode, but instead that edit mode is available for the selected cell 300. In the event that the user moves the input device indicator 305 away from the selected cell 300, it reverts to its first configuration.

Once a cell 220 is selected, a user may manipulate it in multiple ways. He may, for example, delete it, copy it, change the format, move it, and so on. All of these actions may be taken while an exemplary embodiment remains in select mode. If the user uses the keyboard to type new cell contents while in select mode, the previously stored contents of the cell will be replaced by what is typed. Additionally, he may choose to enter edit mode and edit the contents of the cell, which allows for editing any part of the current contents; the contents of the cell arenot necessarily lost. Using the keyboard to enter edit mode, the user may press the F2 key. More typically, a user invokes edit mode by positioning the input device indicator 305 over the selected cell 300 and initiating an input signal through use of the input device, in a manner similar to that required to select a cell. In the exemplary program, this constitutes a single click from a mouse while the cursor is positioned over the selected cell 300. An example of a cell in edit mode is shown in FIG. 4.

Figure 4:
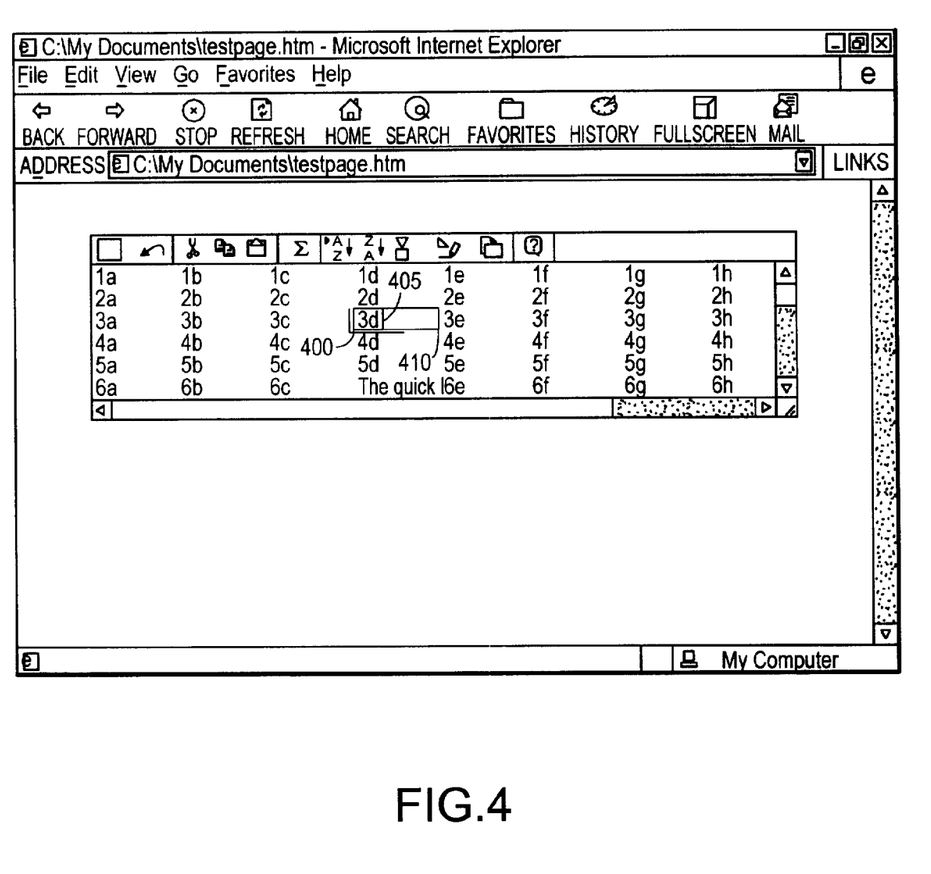
FIG. 4 is a screen display illustrating an edit cell in the process of editing in accordance with an exemplary embodiment of the present invention.

FIG. 4 displays an edit cell 400 within a spreadsheet 200 presented by a web browser window 205. When the spreadsheet 200 enters edit mode, it initiates several actions. First, the edit cell border 410 around the edit cell 400 is changed to a light black line, as opposed to the thicker one signifying a cell has been selected. Second, in the event that the contents of the edit cell 400 require more space to be fully displayed than is currently allocated to the edit cell, the edit cell's contents are displayed on top of the cell(s) immediately to the right of the edit cell. This phenomenon is referred to as "spill text," and will be discussed more fully in conjunction with FIG. 5. Finally, an edit cursor 405 appears in the edit cell 400 itself, allowing the user to alter the contents of the edit cell. In the exemplary program, the edit cursor 405 takes the form of a blinking vertical line. This cursor is independent from the input device indicator 225, which may still be moved around the web browser window 205 and the spreadsheet 200; the edit cursor's function is to show the user where any editing changes to the contents of the edit cell 400 take place.

Still with reference to FIG. 4, once the exemplary embodiment is in edit mode with the edit cell 400 active a user may alter the contents of the edit cell. The edit cell 400 is "active" so long as the user does not select another cell 220. If the user selects a cell. 220 other than the edit cell, the exemplary embodiment will exit edit mode and make the cell 220 the selected cell 300, as described in conjunction with FIG. 3. A user alters the contents of the edit cell 400 by inputting changes using an input device. The input device need not be the same input device as the one used to select a cell 220 or a selected cell 300. For example, the exemplary program 37 uses one input device for selection (a mouse) and a second for editing changes (a keyboard.) It will occur to those skilled in the art, however, that the same input device could be used for both purposes; a user could move the input device indicator 225 about the web browser window 205 by using the arrow keys on a keyboard, and simply disable the movement of the input device indicator while the keyboard is being used to edit the contents of the edit cell 400. Other combinations are possible without departing from the spirit or letter of the invention.

Figure 5:
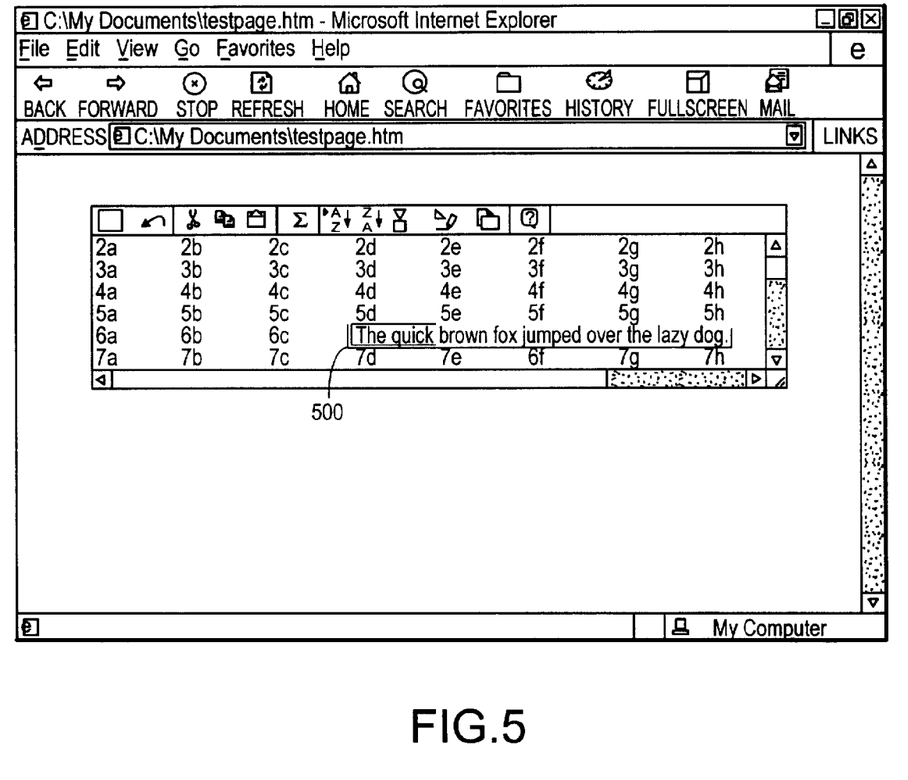
FIG. 5 is a screen display illustrating a cell containing spill text in accordance with an exemplary embodiment of the present invention.

Turning now to FIG. 5, an example of spill text is shown. A spill text cell 500 has been designated as the edit cell. When the edit cell 400 of FIG. 4 contains more data than can be displayed within its boundary, the edit cell is expanded to overlap adjacent cells. The text thus "spills" across cells located to the right of the edit cell, thereby creating the spill text cell 500. Spill text allows a user to see all of the data contained in a cell, thus simplifying the editing process. Without spilling text across adjacent cells a user would be forced to scroll back and forth within the confines of the cell, limiting his view and possibly leading to editing errors. Although the spill text overlaps the contents of adjacent cells, it does not replace it. Once edit mode is exited, the spill text cell 500 is resized so that its size is the same as it was before edit mode was entered. Spill text need not be words; it may be numbers or formulae as well.

Once in edit mode, a user may change the contents of the edit cell 400 as desired, as discussed with respect to FIG. 4. When finished, edit mode may be exited in various ways. First, a user may wish to discard all changes made to the edit cell and restore it to its pre-edit mode condition. A user can accomplish this by initiating a predefined "exit and discard" signal. In the exemplary embodiment, this signal is initiated by pressing the Escape key on the keyboard 40. Second, the changes to the edit cell 400 may be saved upon exit. This is done through the use of an "exit and save" signal. The exemplary program assigns this function to the Enter or Return keys; if these keys are pressed while the exemplary embodiment is in edit mode, the changes are saved to the edit cell 400 and edit mode is exited.

Figure 6:
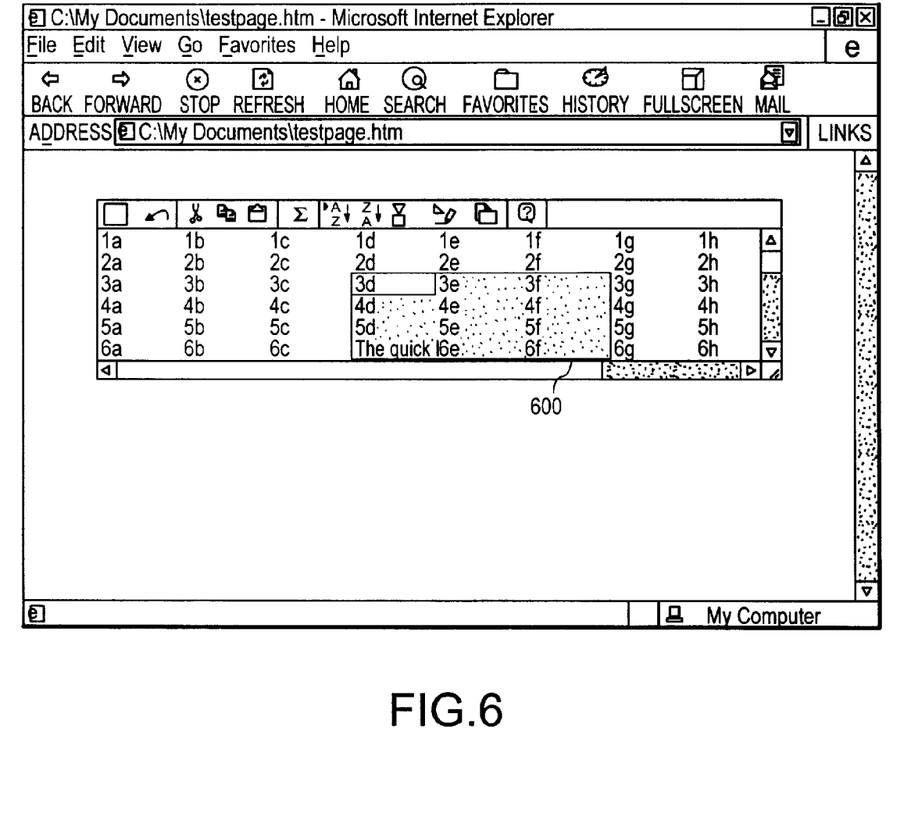
FIG. 6 is a screen display illustrating a selected a range of cells in accordance with an exemplary embodiment of the present invention.

A third option for exiting edit mode, a "click and drag" exit, is illustrated in FIG. 6. A user who has selected a selected cell 300 may not wish to edit it, but instead to select a range of selected cells 600 for the purposes of mass manipulation: moving, formatting, copying, and so on. In the exemplary embodiment, a user accomplishes this by depressing the mouse button while the cursor is over a cell 220, dragging the cursor to the end of a range of cells, and releasing the mouse button. This is commonly referred to as a "click and drag" maneuver. The exemplary embodiment determines the range of selected cells 600 included in the click and drag maneuver by receiving position data from the input device which indicates the location of the input device indicator on the display screen. When a user depresses the mouse button and holds it, the exemplary embodiment retains the position data corresponding to the location of the input device indicator when the mouse button was depressed. As the button is held down and the input device indicator is moved, the exemplary embodiment receives further position data corresponding to the location of the moving input device indicator. When the mouse button is released, the exemplary embodiment selects all cells located between the first set of position information and the current position data. In this way, a user may easily select a range of cells 600 of a size and number according to his desires.

In order not to interfere with select mode, it is important to allow a user who performs a classic click and drag maneuver the ability to select a range of selected cells 600. It can be seen that without this decision step a user who began a click and drag maneuver, or other analogous action, with a selected cell would fall into edit mode rather than selecting a range. It would therefore be impossible to select a range starting with a selected cell 300. Further, a user who is currently editing an edit cell 400 may wish to select a range of selected cells 600, starting with the edit cell. The exemplary program allows a user to do this through the click and drag maneuver described above. Performing a click and drag maneuver while in edit mode will also have the effect of exiting edit mode; the edit cell 400 will now simply be part of the range of selected cells 600. Any changes that the user made to the edit cell while in edit mode are saved, rather than discarded.

Figure 7:
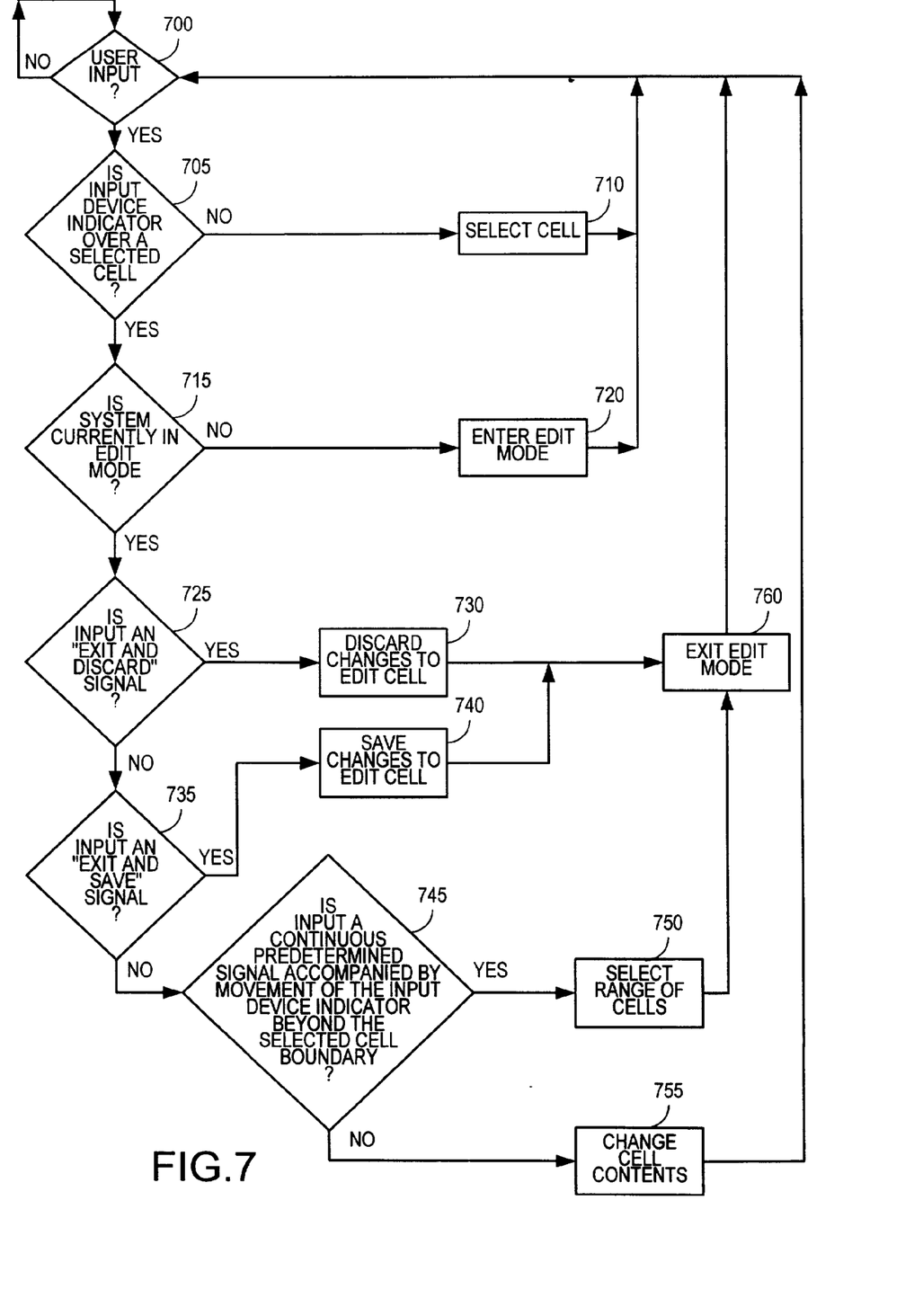
FIG. 7 is a flowchart illustrating a method for entering and exiting edit mode in accordance with an exemplary embodiment of the present invention.

The flowchart in FIG. 7 illustrates the steps involved in entering edit mode, beginning with block 700. In block 700, the method continuously polls for user input. Once detected, the method proceeds to block 705, where it determines whether the input device indicator 225 is positioned over a selected cell 300. If a cell 220 is selected and the user input comes when the input device indicator is positioned over the selected cell, then the method proceeds to block 715. Otherwise, in block 710 the cell over which the input device indicator is positioned becomes the selected cell 300, then polling for user input in block 700 commences. Block 710 also has the effect of making the selected cell border 310 much darker than the border surrounding a regular cell, thus providing visual feedback indicating that a cell has been selected.

Presuming that the input device indicator was positioned over a selected cell in block 705, step 715 is proceeded to and it is evaluated whether edit mode is currently active. If not, then in step 720 edit mode is entered. This performs two main functions: first, the cell border 410 changes to show that the selected cell 300 is now the edit cell 400; and second, a user may now edit the contents of the edit cell. In order to maintain separation between the select and edit modes, the input device indicator 225 may freely move about the spreadsheet 200, while an edit cursor 405 is used for editing tasks. The edit cursor indicates where any changes to the contents of the cell will take place. After entering edit mode, block 700 is returned to, in order to wait for additional user input.

If, however, enter mode is active when decision block 715 is reached, it must be further evaluated what type of user input was received during polling 700. Step 725 analyzes whether the user input is an "exit and discard" signal; the exemplary program 37 assigns this function to the Escape key. If the user initiates an "exit and discard" signal, then block 730 discards any changes that may have been made to the edit cell 400 while the method was in edit mode. After block 730 edit mode is exited, as shown in block 760. Finally, the step of polling for user input 700 is executed. In the event that the user input is not an "exit and discard" signal, decision block 735 is executed next.

In decision block 735, it is determined if the user input constitutes an "exit and save" signal and, if so, block 740 is accessed. A standard "exit and save" signal used in the exemplary program 37 is the signal generated by a user pressing the Return or Enter keys on a keyboard 40. In block 740 any changes made to the edit cell 400 are saved, then edit mode is exited in block 760. As before, once edit mode is exited step 700 polls for user input. In the event that the user input is not an "exit and save" signal, decision block 745 is performed.

Decision block 745 checks the user input to see if it is a continuous predetermined signal accompanied by movement of the input device indicator 225 a set distance beyond the boundaries of the edit cell 400. A user who has selected a selected cell 300 may not wish to edit it, but instead to select a range of selected cells 600 for the purposes of mass manipulation: moving, formatting, copying, and so on. In the exemplary embodiment a user accomplishes this by depressing the mouse 42 button while the cursor is over a cell 220, dragging the cursor to the end of a range of cells, and releasing the mouse button. This generates a button data indication combined with position data indicating the movement of the mouse cursor; the button data indication ceases when the user releases the mouse button. This is commonly referred to as a "click and drag" maneuver. In order not to interfere with select mode, it is important to allow a user who performs a classic click and drag maneuver the ability to select a range of selected cells 600. It can be seen that without this decision step a user who began a click and drag maneuver, or other analogous action, with a selected cell would fall into edit mode rather than selecting a range. It would therefore be impossible to select a range starting with a selected cell 300. Block 745 overcomes this difficulty by checking for the aforementioned combination of a continuous predefined input signal and the movement of the input device indicator 225 beyond the boundaries of the cell. If this combination is present, then step 750 is next, wherein it selects the range of cells indicated by the user, after which step 760 exits edit mode. The user thus returns to selection mode with a range of cells 600 selected, as shown in FIG. 6.

In the event that decision block 745 yields a "no" result, block 755 changes the contents of the edit cell 400 in accordance with the user input. This may consist of adding, deleting, overwriting, or performing other functions on an edit cell's contents. Once the changes are accomplished, additional user input is monitored for in step 700. This method continues to repeat this loop until the user has completed all input, and made as many changes to the edit cell 400 as desired.

Figure 8:
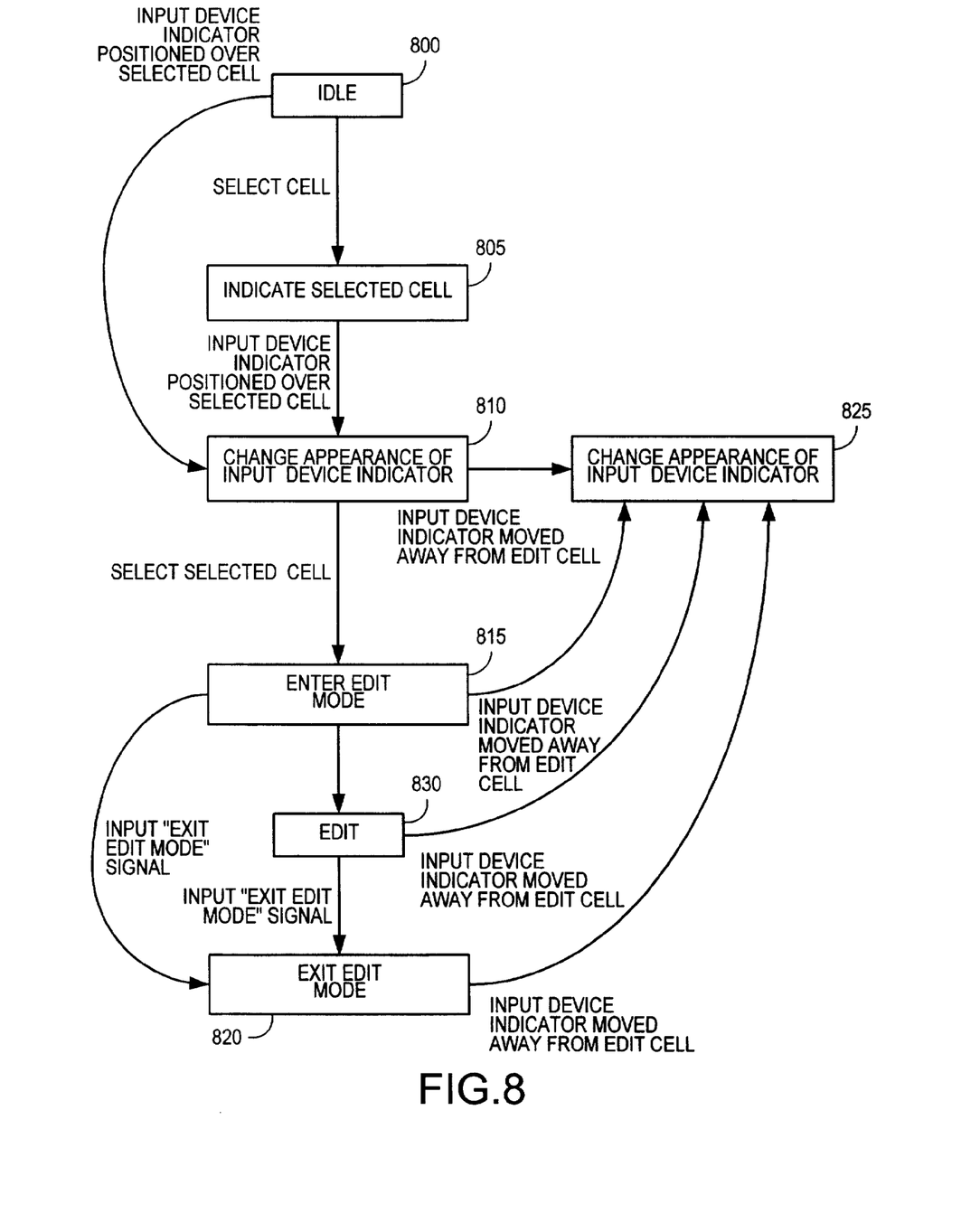
FIG. 8 is a state diagram illustrating a method for editing a spreadsheet from within a web browser in accordance with an exemplary embodiment of the present invention.

FIG. 8 is a state diagram illustrating an exemplary method for editing a spreadsheet 200 displayed in a web browser window 205 through the use of a single click. Those skilled in the art will understand that the process described by the state diagram of FIG. 8 is executed by the processing unit 21 (FIG. 1) in response to instructions that have been incorporated into various program modules, including the operating system, exemplary program 37, and so on.

The first state is an initial idle state 800. A time interval elapses between each change of state, and the changes are dependent upon the current input event. In the idle state 800, the exemplary program 37 is running, with a spreadsheet 200 comprising multiple cells 220 displayed in the web browser window 205, as shown in FIG. 2. While the user may be performing activities, such as utilizing other application programs, accessing pull-down menus in the exemplary program 37, or printing documents, the program is idle in the sense that no action will be taken with respect to editing the spreadsheet if no user input directed towards that end occurs. It will be appreciated that the state machine may return to an idle state 800 from any of the later steps simply through the termination of input by the user; these return paths are not displayed on FIG. 8 in order to preserve clarity.

If the user selects a cell 220 through the use of the input device, the state changes to an indication of selected cell state 805. In state 805, the appearance of the cell changes as the method places a dark black border around the cell edge. This indicates that the user has successfully selected the cell in question. At this point, the user can move the input device so that the input device indicator 225 is no longer positioned over the now selected cell 300, thereby returning to idle state 800. Alternatively, the user may leave the input device indicator over the selected cell, in which case the state machine proceeds to state 810.

In state 810, the state machine changes the appearance of the input device indicator 225 to indicate that edit mode is now available for the selected cell 300. In the exemplary program 37, the input device indicator changes from its default display (a plus symbol) to an I-bar. The default input device indicator 225 is shown on FIG. 2, while the changed input device indicator 305 is shown on FIG. 3. Those skilled in the art will recognize that an I-bar traditionally indicates an editing function in programs such as word processors. Here, however, the I-bar indicates the availability of an editing function, rather than the use of the function itself. At this point, the user may either move the input device indicator 305 so that it no longer hovers over the selected cell 300, leave the input device indicator in place, or select the selected cell. If the input device indicator is left in its current position, then the state machine returns to idle state 800 and awaits further input.

If the input device indicator is moved beyond the bounds of the selected cell 300, then state 825 is entered, and the input device indicator 305 returns to its default configuration 225. In the exemplary program 37, this is a plus symbol. This is illustrated in FIG. 2, where input device indicator 225 may be seen. Once the input device indicator is reset, the state machine executes idle step 800.

If, however, a user selects the selected cell 300, then the state machine moves to step 815. In step 815, the selected cell becomes the edit cell 400 and the state machine enters edit mode for the edit cell. With respect to the exemplary program 37, the state machine initiates several changes to the display and the method upon entering edit mode. First, the border around the edit cell 400 is changed to a light black border, as opposed to the thicker one signifying a selected cell. Second, in the event that the contents of the edit cell require more space to be fully displayed than is currently allocated to the edit cell, the edit cell's contents are displayed on top of the cell(s) 220 immediately to the right of the edit cell. Finally, an edit cursor 405 appears in the cell itself, allowing the user to alter the contents of the edit cell. In the exemplary program the edit cursor takes the form of a blinking vertical line. This cursor is independent from the exemplary program's 37 general cursor, which may still be moved around the spreadsheet; the edit cursor's function is to show the user where any editing changes to the contents of the cell take place. Once the state machine is in the edit mode state 815, the user may proceed to change the edit cell's 405 contents. Doing so invokes the edit state 830. Alternatively, the user may move the input device indicator 305, in which case the method proceeds to the change cursor state 825, discussed previously.

Yet a third option from the enter edit mode state 815 is for the user to initiate an "exit edit mode" signal, dropping the method into the exit edit mode state 820. In the exemplary program, there are four possible methods for initiating an "exit edit mode" signal: the Esc key; the Enter or Return keys (or other actions that may cause an implicit "Enter" to be performed, such as clicking a button on the toolbar at the top of the spreadsheet); selecting a cell other than the edit cell 400; and finally by selecting the edit cell and dragging the input device indicator 225 beyond the boundaries of the edit cell. Each of these signals is discussed in detail with respect to FIG. 7. Once the exit edit mode state 820 is entered, the state machine saves or discards the changes made to the edit cell 400, depending on the type of exit edit mode signal detected. Again, for a more comprehensive discussion of these signals see the discussion with respect to FIG. 7.

If instead the user edits the contents of the edit cell 400, the state machine proceeds to edit state 830. In the edit state 830, the user may initiate changes to the contents of the edit cell. In the exemplary program, the changes in the edit cell 400 are shown as the user inputs them. It can be appreciated by those skilled in the art that other alternatives exist, such as having all changes shown in a separate area of the display screen 47 and entered into the cell only upon confirmation by the user.

If the user moves the input device indicator 305 off of the edit cell 400, then state 825 is entered, and the input device indicator is changed from the edit mode available configuration 305 to the default configuration 225. Alternatively, a user may input an "exit edit mode" signal of the three types discussed with respect to step 815 and FIG. 7. Once the state machine detects any of these three inputs, it proceeds to the exit edit mode step 820.

Conclusion

From the foregoing description, it will be appreciated that an exemplary embodiment supports a method for editing a spreadsheet. Specifically, an exemplary embodiment allows a user to edit a spreadsheet within a web browser program. As a result, the user may more conveniently access and manipulate information stored in spreadsheet format that may be located remotely from the user.

The invention may conveniently be implemented in one or more program modules that are based upon the state diagram of FIG. 8, the flowchart of FIG. 7, and the features illustrated in FIGS. 2–6. No particular programming language has been described for carrying out the various procedures described above because it is considered that the operations, steps, and procedures described above and illustrated in the accompanying drawings are sufficiently disclosed to permit one of ordinary skill in the art to practice an exemplary embodiment. Moreover, there are many computers and operating systems which may be used in practicing an exemplary embodiment and therefore no detailed computer program could be provided which would be applicable to all of these many different systems. Each user of a particular computer will be aware of the language and tools which are most useful for that user's needs and purposes.

Although an exemplary embodiment was described using an ActiveX component (typically used within a web browser) as the exemplary program, those skilled in the art will appreciate that an exemplary embodiment is not limited to this arrangement, but may include any means of accessing a spreadsheet, and editing the spreadsheet. For example, ftp programs, email programs, and so forth are embraced by the spirit of an exemplary embodiment. Further, although an exemplary embodiment was described using a mouse as the input device, those skilled in the art will appreciate that an exemplary embodiment is not limited to this arrangement, but may include multiple forms of input devices, such as trackballs, keyboards, light pens, joysticks, and so forth.

Alternative embodiments will become apparent to those skilled in the art to which an exemplary embodiment pertains without departing from its spirit and scope. Accordingly, the scope of an exemplary embodiment is defined by the appended claims rather than the foregoing description.

We claim:

1. A method for editing a spreadsheet comprising a plurality of cells, comprising the steps:
   displaying the spreadsheet;
   when a cursor is positioned over one of the cells of the spreadsheet, receiving a first single click;
   in response to the first single click, selecting the one of the cells and causing the cursor to have a first predetermined shape when the cursor is positioned over the selected cell and a second predetermined shape when the cursor is not positioned over the selected cell;
   when the cursor is positioned over the selected cell, receiving a second single click; and
   in response to the second single click, entering an edit mode for editing the contents of the selected cell and inserting an edit curser in the selected cell at a position above which the cursor was located when the second single click was received.

2. The method of claim 1, wherein positioning of the cursor is controlled by a mouse.

3. The method of claim 2, wherein the first predetermined shape comprises a plus symbol, and wherein the second predetermined shape comprises an I-bar.

4. The method of claim 1, further comprising the steps:
   when the cursor is positioned over the selected cell, receiving a click and drag operation indication;
   in response to the click and drag operation indication, providing a first position indication corresponding to the position of the cursor when the click and drag operation indication was received; and
   in response to the cursor being moved to a second position over a cell other than the selected cell while the click and drag operation indication is maintained, exiting the edit mode, entering a cell selection mode, and providing visual feedback corresponding to a selected region, the selected region including a rectangular area extending from the first position indication to the second position.

5. The method of claim 1, further comprising the step of in response to the selection of the one of the cells, displaying a first visual indication around the selected cell.

6. The method of claim 1, wherein the spreadsheet is displayed within a web browser.

7. The method of claim 1, wherein the spreadsheet is remotely accessible and editable across the World Wide Web.

8. A computer system for editing a spreadsheet comprising a plurality of cells, comprising:
   a processing unit;
   an input device connected to the processing unit;
   a memory storage device operative for storing a program module;
   a display device, coupled to the processing unit, operative to display the spreadsheet on a display screen;
   an input device indicator, operative to move across the display screen in response to a signal from the input device; and
   a processing unit, responsive to instructions from the program module running on the computer system, operative to:
     display the spreadsheet within a web browser window;
     receive from the input device a first single click specifying one of the cells for selection;
     in response to the first single click, select the specified cell;
     receive from the input device an indication that the input device indicator is positioned over the selected cell;
     in response to the indication that the input device indicator is positioned over the selected cell, change the input device indicator to a predetermined icon indicating that an edit mode may be entered for the selected cell;
     receive from the input device a second single click indicating that the edit mode is desired for the selected cell; and
       in response to the second click, enter an edit mode for editing the contents of the selected cell and inserting an edit cursor in the selected cell at a position in the selected cell above which the input device indicator is positioned.

9. The system of claim 8, wherein the input device is a mouse.

10. The system of claim 8, further operative to:
    receive from the input device a click and drag operation indication when the input device indicator is positioned over the selected cell;
    in response to receiving from the input device the click and drag operation indication, providing a first position indication corresponding to a first position of the input device when the click and drag operation indication was received from the input device;
    in response to the input device being moved from the first position to a second position while the click and drag indication operation is maintained, providing visual feedback corresponding to a selection region, the selection region including a rectangular area extending from the first position to the second position;
    in response to an indication that the click and drag operation has ended, selecting a range of cells that are included in the selection region and exiting the edit mode.

11. The system of claim 10, further operative to, in response to the selection of the specified cell, provide a first indication around the selected cell indicating that the selected cell has been selected.

12. A computer-readable medium on which is stored a program module for editing a spreadsheet comprising a plurality of cells, the program module comprising instructions which, when executed by a computer, performs the steps of:

displaying the spreadsheet;

receiving an indication that a cell has been selected;

in response to the indication that the cell has been selected, displaying a first visual indication around the selected cell;

receiving an indication that a selected cell has been selected;

in response to the indication that the selected cell has been selected, entering an edit mode for editing the contents of the selected cell, the edit mode indicated by displaying a second visual indication around the edit cell;

receiving position data from an input device, the position data indicative of the position of an input device indicator;

receiving from the input device an indication that the edit cell has been selected;

in response to the indication that the edit cell has been selected, providing a first position indication corresponding to the position of the input device indicator when the third input signal was initiated;

in response to the input device being moved while the indication that the edit cell has been selected is maintained, providing visual feedback corresponding to a selection region, the selection region including a rectangular area extending from the first position indication through the current position data;

in response to the input signal terminating, selecting the range of cells that are included in the selection region; and in response to selecting the range of cells, exiting edit mode.

13. The computer-readable medium of claim 12, further comprising the steps of:

receiving an indication that the input device indicator is positioned over the selected cell;

in response to the input device indicator being positioned over the selected cell, changing the input device indicator to a predetermined icon indicating that the cell may be edited.

14. The computer-readable medium of claim 13, in which the predetermined icon indicating that the cell may be edited comprises an "I" bar.

15. The computer-readable medium of claim 14, in which the indication that the user has selected the selected cell is a single mouse click.

16. The computer-readable medium of claim 12, further comprising the step of:

analyzing whether the contents of the edit cell extend beyond the initial boundaries of the edit cell; and extending the boundaries of the edit cell as necessary to accommodate more data in the edit cell than can be accommodated within the initial boundaries of the cell.

17. The computer-readable medium of claim 12, in which the spreadsheet is stored remotely from the program module and is displayed within a web browser window.

* * * * *

UNITED STATES PATENT AND TRADEMARK OFFICE
CERTIFICATE OF CORRECTION

PATENT NO. : 6,549,878 B1  Page 1 of 1
DATED : April 15, 2003
INVENTOR(S) : Lowry et al.

It is certified that error appears in the above-identified patent and that said Letters Patent is hereby corrected as shown below:

Column 14,
Line 24, insert -- an indication of -- after "device" and insert -- operation -- after "click".
Line 37, delete "indicating" and insert -- indication specifying --.

Signed and Sealed this

Seventeenth Day of February, 2004

JON W. DUDAS
*Acting Director of the United States Patent and Trademark Office*